UNITED STATES PATENT OFFICE.

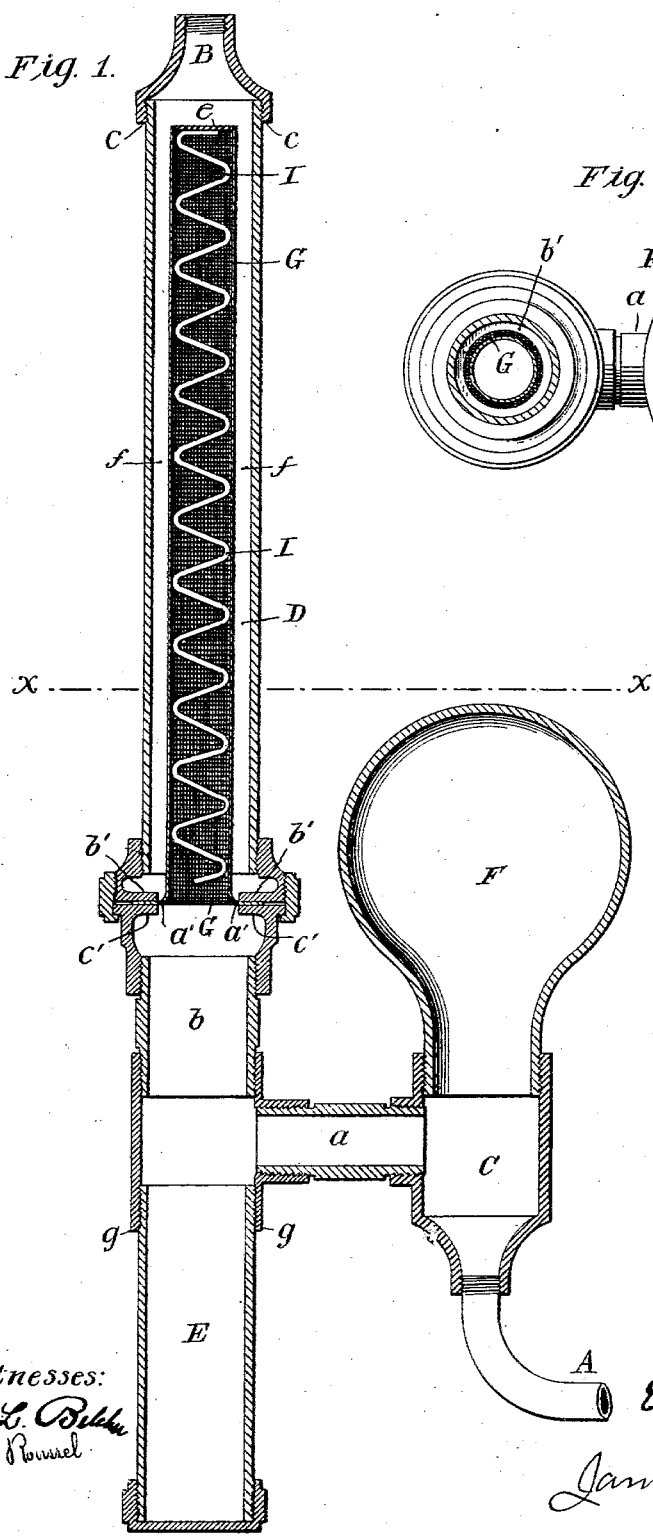
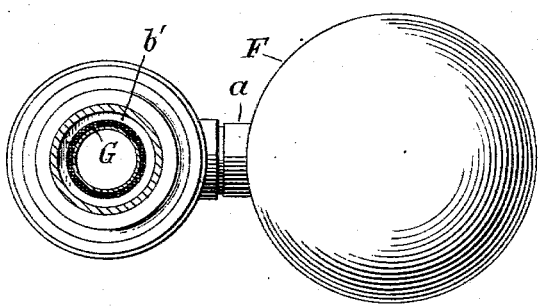

EDWIN A. LELAND, OF GREAT BARRINGTON, MASSACHUSETTS, ASSIGNOR TO THE LELAND FILTER COMPANY, OF SAME PLACE.

WATER-SUPPLY FOR BUILDINGS.

SPECIFICATION forming part of Letters Patent No. 629,376, dated July 25, 1899.

Application filed January 25, 1899. Serial No. 703,378. (No model.)

*To all whom it may concern:*

Be it known that I, EDWIN A. LELAND, of Great Barrington, in the county of Berkshire and State of Massachusetts, have invented a new and useful Improvement in the Water-Supply of Buildings; and I do hereby declare that the following is a full, clear, and exact description of the same, reference being had to the accompanying drawings, making a part of this specification, in which—

Figure 1 is a vertical longitudinal sectional view of an apparatus made according to my invention. Fig. 2 is a partial horizontal sectional view taken in the line $x$ $x$ of Fig. 1.

With the water-supply systems of dwellings and other buildings it has heretofore been found impracticable to remedy two drawbacks to perfectly satisfactory use. One of these lies in the passage with the water of various mechanical impurities, insects, larvæ, decaying organic substances, and various mineral impurities. The other lies in the so-called "hammering" which occurs when the movement of a volume of water in a pipe or passage is suddenly checked and the liquid is caused to recoil upon itself, and consequently upon the contents of the main. The object of my invention is to provide efficient means for rectifying these objections; and it comprises certain novel and original combinations of parts whereby that object is effectually attained.

A is the service-pipe, which in the usual or any suitable manner connects with the street-main or other source of water-supply.

B is the usual or any suitable distributer-pipe, through and from which the water is conducted for distribution through a building.

Interposed between and in connection with the pipes A and B is the apparatus included in my invention. In this latter, C is an inlet chamber or passage which connects, as by passages $a$ $b$, with the bottom of a screen-chamber D. To secure the best results, this screen-chamber is of tubular form, as shown in Fig. 1, and preferably of circular or cylindric cross-section. The upper end of this chamber connects with the distributer-pipe B, as shown at $c$. Located below the screen-chamber is a sediment-chamber E, so arranged that impurities or sediment having a greater specific gravity than water may descend and be deposited in said sediment-chamber. In connection with the inlet at C, preferably immediately above the same and in direct communication therewith, is an air-chamber F. Placed within the screen-chamber D is a foraminated screen G, which is preferably made of wire-cloth. It is closed at its top $e$ and is of such proportions that a space or passage $f$ is provided between the screen and the surrounding walls of the chamber C. This space or passage $f$ is shut off from communication with the inlet from the source of water-supply except through the orifices or meshes of the screen—in other words, is constructed and arranged to receive within it the volume of water from the inlet C on its way to the distributer-pipe B. This is most conveniently done by providing the lower end of the screen with a circumferential flange $a'$, which is gripped between the two parts $b'$ $c'$ of the coupling by which the chamber C is connected with the parts below, as shown in Fig. 1. Placed within and bearing outwardly against the inner surface of the screen D is a frame I, which may be most conveniently and economically provided by a spiral wire having the requisite diameter of coil and thrust longitudinally within the chamber C and resting snugly against the inner surface of the screen. The spiral wire thus affords an effective support from within against the reaction impact of the reversed volume of water when the upward flow from the inlet C is arrested.

In the operation of the apparatus when the water is turned on at its exit from the distributing-pipe the volume of water from the main or source of supply passes through the passages C, $a$, and $b$ into the interior of the screen G, thence from within said screen outward through the orifices or interstices of the screen into the space $f$ between the screen and the walls of the chamber D, and thence to the distributer-pipe B. The water in its passage as just described has separated therefrom all impurities or foreign matter, which cannot pass through the screen and which being thus separated from the water passed through the screen descend by gravity from the screen and are deposited in the sediment-chamber E below, from which they may be removed as occasion demands by removing and replacing the sediment-chamber by means of a threaded coupling g. When the movement of the water is reversed, (as occurs from reaction when exit from the distributing-pipe is stopped, as by turning off the water thereat,) its hammering action is at the start somewhat impeded by the presence of the screen G, which to some little extent retards the reacting or reversed volume of water; but this is alone inefficient for the practically entire prevention of hammering. For the latter purpose the air-chamber F comes into play, inasmuch as the reversed volume of water when checked by resistance of the volume of water in the street-main or source of supply passes to some extent into the air-chamber and being cushioned by the air therein weakens the reaction impact of the reversed current upon the resisting volume at the source of water-supply, this being accomplished to an extent sufficient to prevent audible jar or vibration in or through the system—in other words, to prevent any appreciable hammering as a result of a sudden stoppage of the flow through or in the delivery-pipe.

What I claim as my invention is—

The combination with the service-pipe and distributer-pipe of a water-supply system, of a tubular screen-chamber placed between said pipes, a tubular screen placed in said chamber arranged to receive within it the inlet-water and having a space between itself and the walls of the chamber, a sediment-chamber below the screen, and an air-chamber interposed between the screen and the water-inlet from the service-pipe, substantially as herein set forth.

EDWIN A. LELAND.

Witnesses:
HOWARD WHEELER,
O. C. BIDWELL.